UNITED STATES PATENT OFFICE.

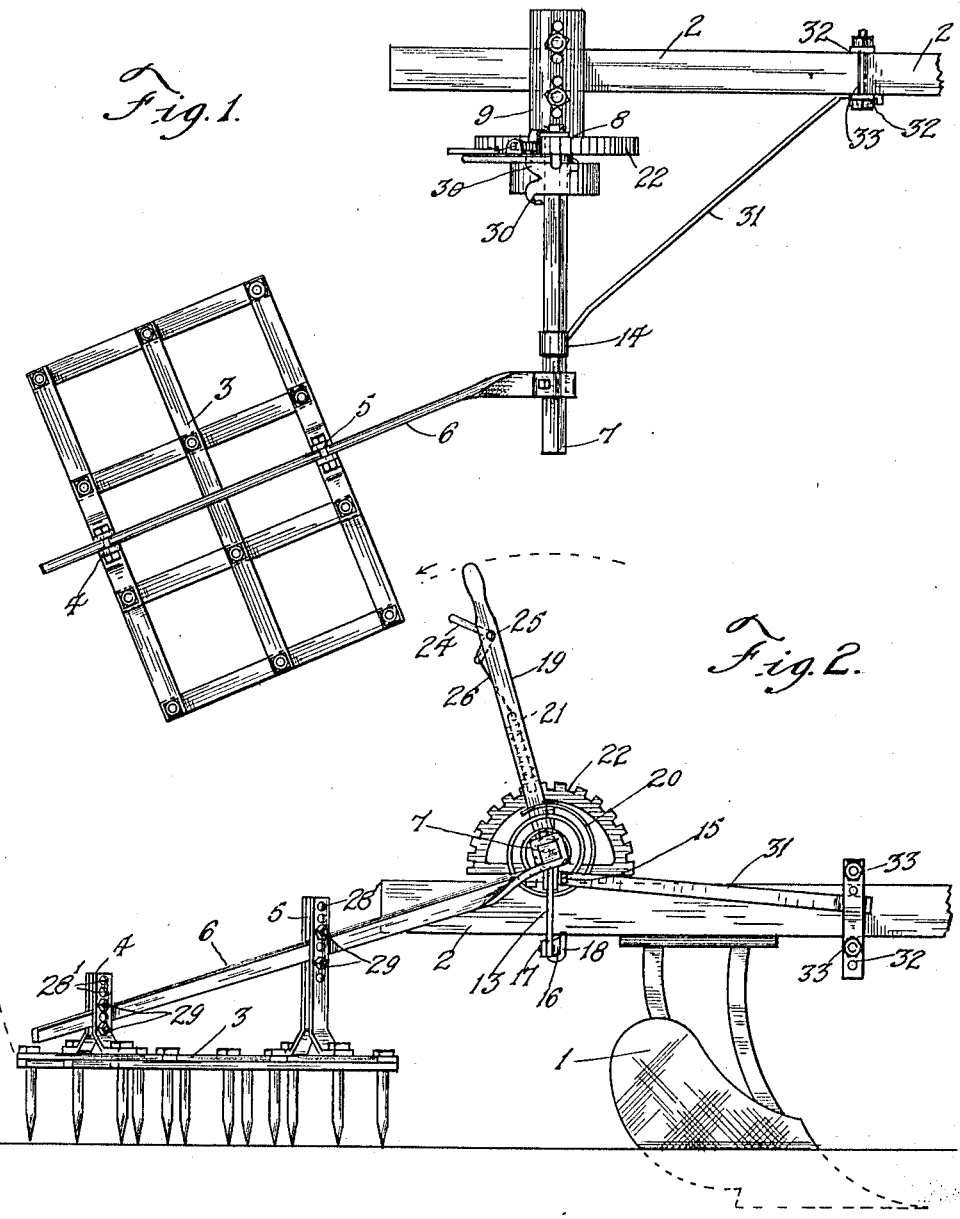

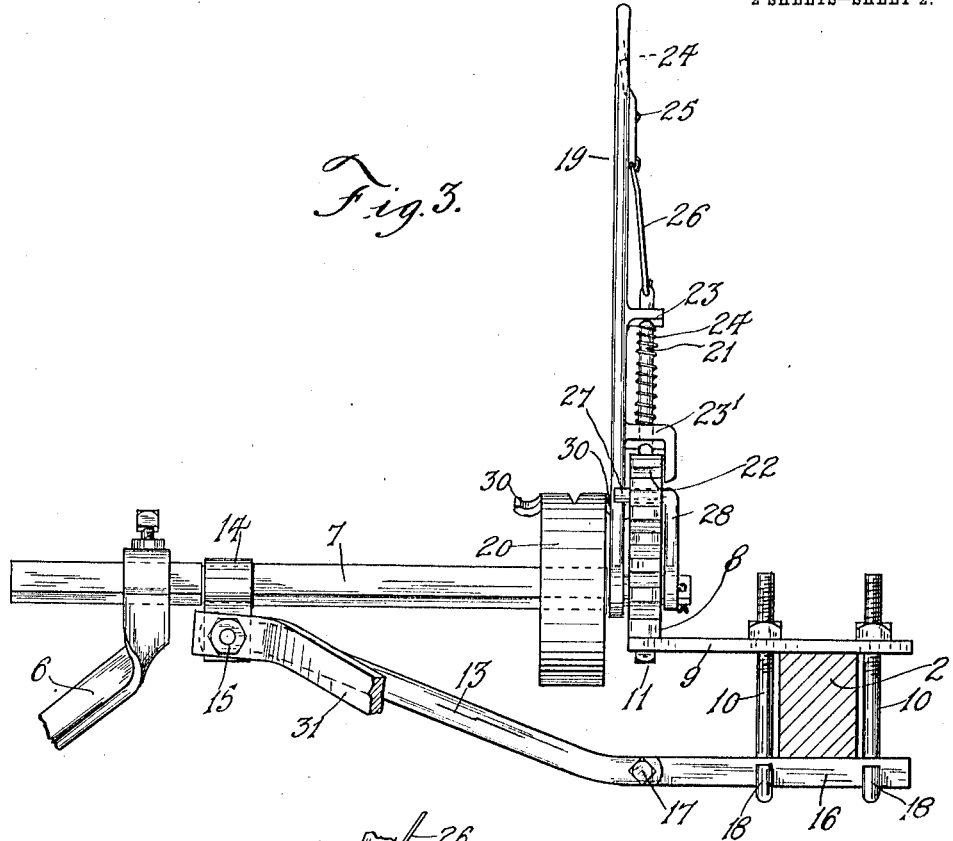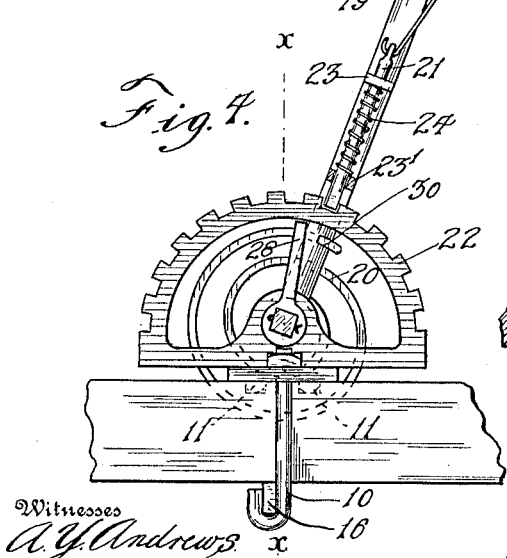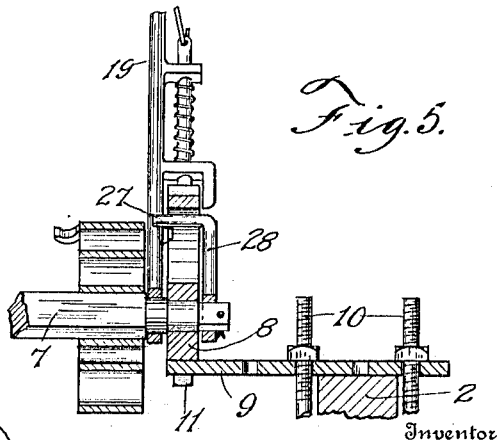

WILLIARD O. LONG, OF MANSFIELD, OHIO, ASSIGNOR TO STOUGHTON WAGON COMPANY, OF STOUGHTON, WISCONSIN, INCORPORATED.

HARROW ATTACHMENT.

1,039,152.    Specification of Letters Patent.    Patented Sept. 24, 1912.

Application filed August 16, 1909. Serial No. 512,985.

*To all whom it may concern:*

Be it known that I, WILLIARD O. LONG, a citizen of the United States, residing at Mansfield, county of Richland, and State of Ohio, have invented new and useful Improvements in Harrow Attachments, of which the following is a specification.

My invention relates to improvements in harrow attachments for plows, and it pertains more especially, first, to the device for applying a yielding downward pressure to the harrow whereby the teeth of the same are caused to penetrate the surface of the soil a greater or less depth according to the adjustment of an operating lever through which such pressure is applied. Second, to the device for raising and supporting the harrow above the surface of the ground.

The construction of my invention is explained by reference to the accompanying drawings, in which, Figure 1 represents a plan view thereof as the same appears in connection with the rear end of a plow beam. Fig. 2 is a side view of the device shown in Fig. 1. Fig. 3 is a front view of the device for adjustably supporting the harrow. Fig. 4 is a detail view of the mechanism for applying a downward yielding pressure to the harrow, and Fig. 5 is a vertical section drawn on line X—X of Fig. 4.

Like parts are identified by the same reference numerals throughout the several views.

While my harrow supporting device is adapted to be used with a gang plow, I have for convenience of description shown the same in connection with a single plow only.

1 represents a plow of ordinary construction. 2 is the beam.

3 is a harrow which is yieldingly connected with the beam 2 of the plow through the vertical standards 4 and 5, draw-bar 6, shaft 7, journal bearings 8, adjustable supporting plate 9 and bolts 10—10 and 11—11. The shaft 7 is supported near its outer end by the brace member 13, which member 13 is connected at one end to the shaft 7 through the supporting loop 14 and bolt 15, and at its opposite end to the beam 2 through the adjustable bar 16, bolts 17 and bolts 10—10. The bolts 10—10 are provided with U shaped bends 18—18 which are adapted to engage the lower edge of the adjustable bar 19 whereby said bar is clamped to the lower side of the beam 2.

19 is an operating lever by which a yielding downward pressure is applied to the harrow through the coil spring 20, shaft 7 and draw-bar 6. The lever 19 is provided with an aperture at its lower end for the reception of the end of the shaft 7 upon which it is adapted to turn. The spring 20 is rigidly fixed at its inner end to the shaft 7 and is connected at its outer end to the operating lever 19 whereby as the lever 19 is thrown rearwardly in the direction indicated by the arrow, reference being had to Fig. 2, the shaft 7 is turned a partial revolution with said lever, motion being communicated from the lever 19 to the shaft 7 through the coil spring 20 whereby the free end of the draw-bar 6 is moved downwardly and the harrow 3 is yieldingly retained in the soil over which it is drawn. The lever 19 is retained at any desired point of adjustment by the spring actuated stop 21 and semi-circular ratchet 22. The stop 21 is slidably supported from the lever 19 by the retaining keepers 23—23' and is forced downwardly by the recoil of the spiral spring 24, the lower end of said spring being connected to said stop 21, while the upper end bears against the lower side of the keeper 23, thus it is obvious that by pressing downwardly on the lever 19 any desired pressure may be applied to the harrow whereby the same is caused to penetrate the soil a greater or less depth while it is retained at the desired point of adjustment by the engagement of the stop 21 in the teeth of the ratchet.

24 is a hand lever by which the stop 21 is with-drawn from the teeth of the ratchet. The lever 24 is pivotally connected with the side of the lever 19 by the pin 25 and the lower arm of the lever 24 is connected with the stop 21 by the link 26. When desirous of raising the harrow from the ground, the stop 21 is disengaged from the ratchet 22. When the lever is moved in the opposite direction or from right to left, reference being had to Fig. 4, motion is communicated from the lever 19 to the harrow through the angular projection 27, reversing lever 28 and shaft 7, whereby the free end of the draw-bar 6 and the harrow which is supported therefrom are raised. Thus it is obvious that the harrow may be elevated above the surface of the ground or may be forced downwardly in yielding contact therewith as desired by the adjustment of the operating lever 19 and said lever 19 is retained at any desired point of adjustment by the spring actuated stop 21 and ratchet 22.

The standards 4 and 5 are preferably provided with a plurality of apertures 28' for the reception of the clamping bolts 29 whereby said harrow may be adjusted near to or farther from the plane of the plow beam as may be required to correspond with the depth of the furrow which is being formed by the plow. The outer end of the coil spring 20 is preferably provided with two hooks 30—30 formed for the reception of the operating lever 19 and through which motion is communicated from the lever 19 to the coil spring 20 when applying a downward pressure to the harrow. The object of providing the spring 20 with more than one hook is to adapt the same to be used in connection with so-called right and left plows. When used with plows which are adapted to turn the furrow toward the right, the operating lever 19 is adapted to engage the hook 30 on the right-hand side of the spring, reference being had to Fig. 3. It is a well known fact, however, that in some parts of the country the greater number of plows are adapted to turn the furrow in the opposite direction, when lever 19 is arranged to operate in hook 30 on the opposite side of the spring, and by thus providing the spring with two hooks the harrow attachment is equally adapted to be used with both styles of plows. 31 is a brace member which is connected at its front end to the beam 2 by the clamping plates 32 and clamping bolts 33 and at its rear end to the shaft 7 by the supporting loop 14 and bolt 15.

Having thus described my invention what I claim as new and desire to secure by Letters Patent is,

In a harrow attachment for plows, the combination of a shaft revolubly supported from a plow, a draw-bar rigidly affixed at one end to said shaft and at its opposite end to a harrow, an operating lever pivotally connected at one end with said plow through said shaft, a coil spring rigidly connected at its inner end to said shaft and at its outer end to said lever, a reversing lever rigidly affixed to said shaft and provided with a bearing adapted to contact with said operating lever, and means for locking said operating lever at any desired point of adjustment whereby as the tension of the spring is increased or diminished by the movement of said lever, the harrow connected with said draw-bar will be forced into the soil with a greater or less yielding pressure, and whereby as the movement of said operating lever is reversed, said harrow will be raised from the soil substantially as specified.

In testimony whereof I affix my signature in the presence of two witnesses.

WILLIARD O. LONG.

Witnesses:
 WM. C. HEGELMEYER,
 ADOLPH E. AUSSE.

---

Copies of this patent may be obtained for five cents each, by addressing the "Commissioner of Patents, Washington, D. C."